Patented Nov. 11, 1947

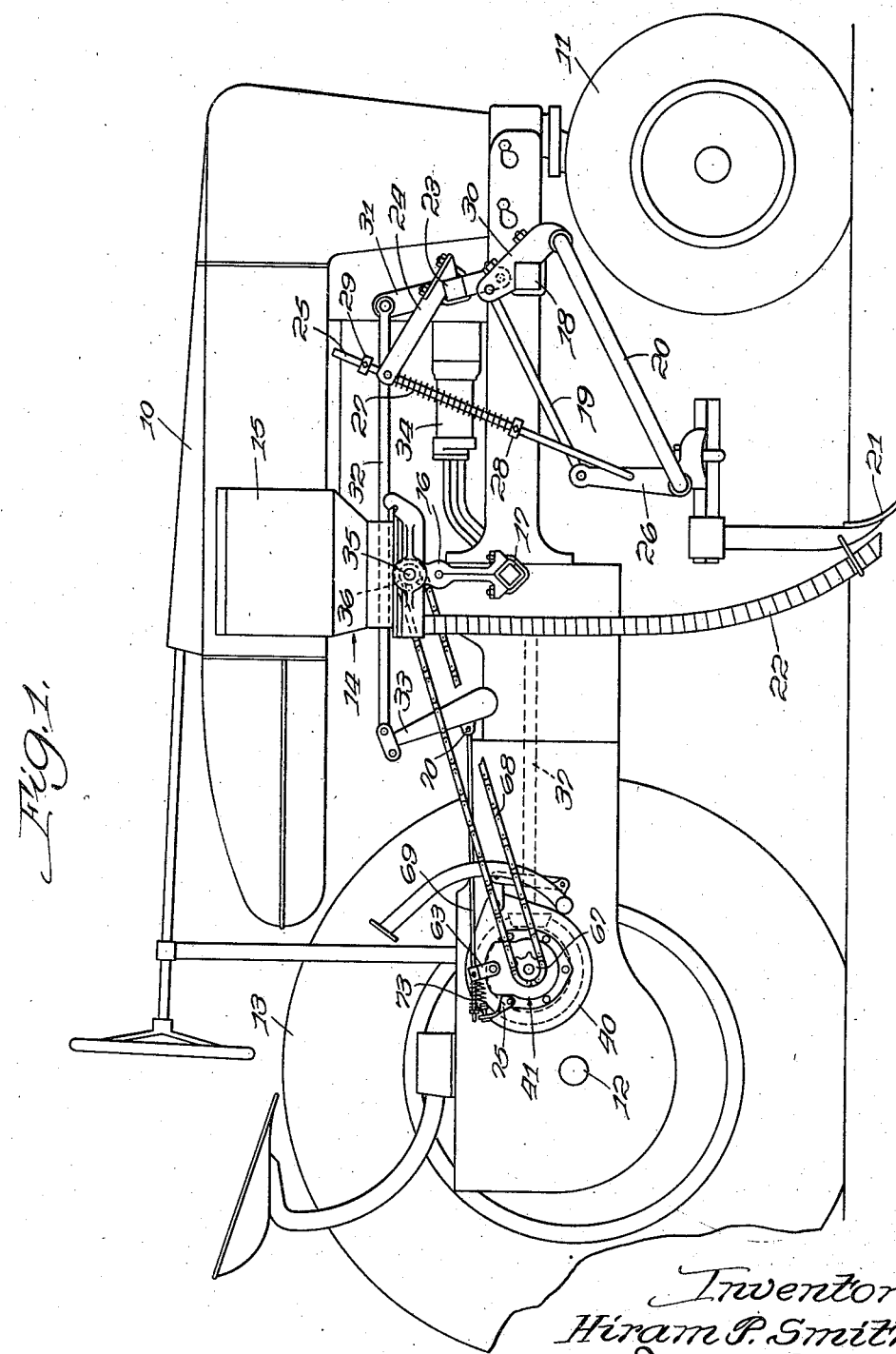

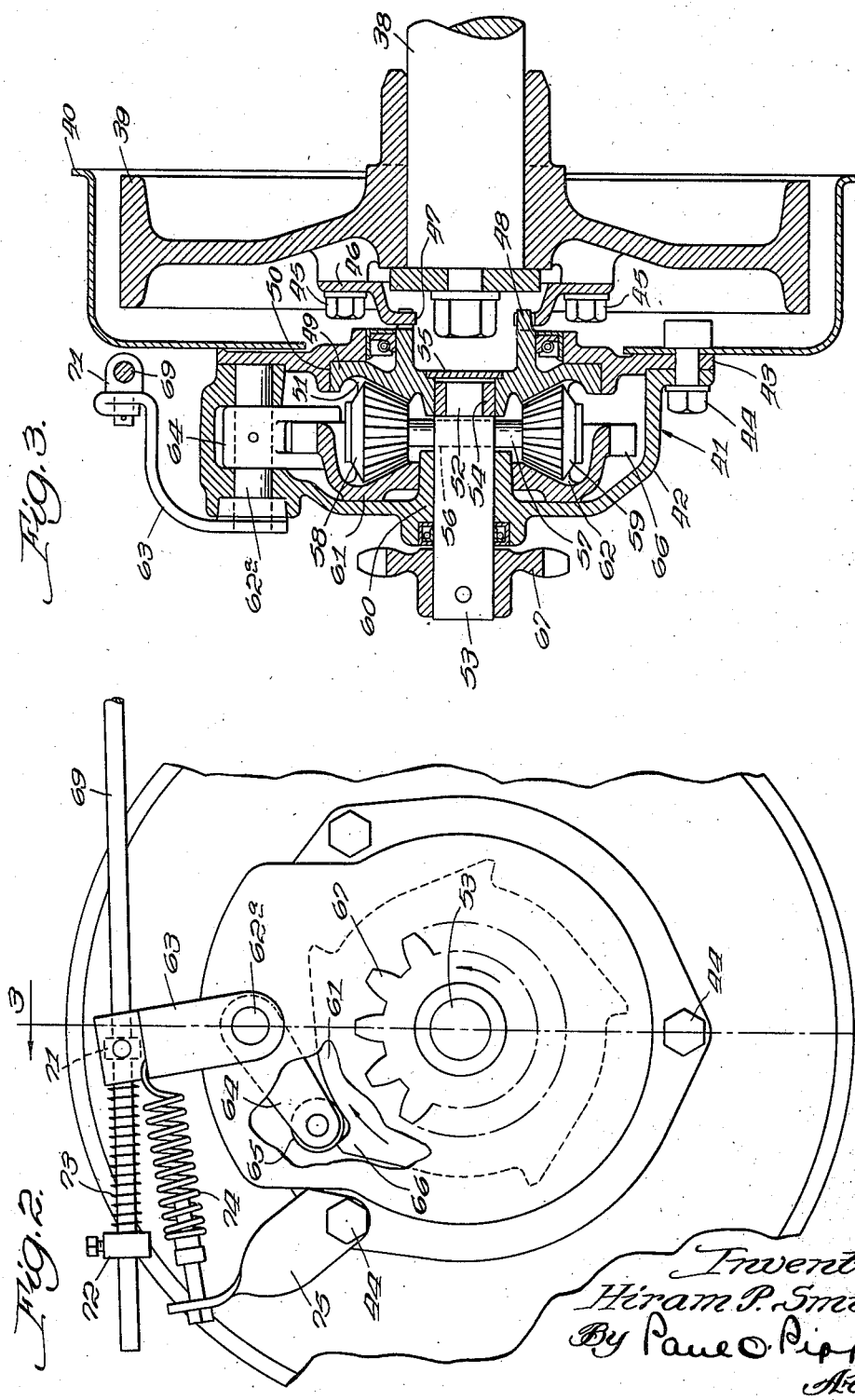

2,430,741

UNITED STATES PATENT OFFICE 2,430,741

DRIVE MECHANISM FOR PLANTERS

Hiram P. Smith, Canton, Ill., assignor to International Harvester Company, a corporation of New Jersey Application November 15, 1944, Serial No. 563,486

9 Claims. (Cl. 111—52)

This invention relates to agricultural implements, and particularly to means for dispensing and depositing material such as seed and fertilizer in the soil. More specifically, the invention concerns a novel drive mechanism for planters and the like.

It is known to drive planters from the power plant of a tractor, upon which they may be mounted, through the intermediary of conventional power take-off devices and chain drives deriving power from ground contacting wheels. Generally, the mechanism for transmitting power from the source to the dispensing mechanism, such as the seed plate drive of a planter, is cumbersome and unsatisfactory. For example, reduction of drive speed transmitted to the planter mechanism generally involves the use of unsatisfactory sprocket ratios resulting in inefficient operation.

The present invention overcomes the difficulties previously encountered and has for an object the provision of an improved drive for planters and the like.

Another object is to provide means for driving a planter mechanism and the like from the tractor brake shaft.

Another object is to provide a planetary gear system for transmitting power from a tractor drive shaft to a planter drive mechanism.

A further object is to provide, in a planter drive, a gear housing which is readily attachable to and removable from a tractor, and a combined planetary gear and clutch assembly within said housing for transmitting power from a tractor brake shaft to a planter drive mechanism or the like.

Other objects and advantages will become clear from the following detailed description when read in conjunction with the accompanying drawings wherein:

Figure 1 is a view in side elevation of a tractor having a planter mounted thereon and showing the location of the drive mechanism therefor;

Figure 2 is an enlarged detail of the drive mechanism as shown in Figure 1; and

Figure 3 is a section taken on the line 3—3 of Figure 2.

Referring to the drawings, it will be noted that a tractor 10 is provided with dirigible front wheels 11 and rear axle 12 supporting rear drive wheels 13, one of which is removed to show the drive mechanism of the present invention.

On the side of the tractor and between the front and rear wheels thereof is mounted a planting mechanism generally indicated at 14, comprising a hopper 15 mounted upon a bracket 16, secured to a transversely extending tool bar 17 attached to the side of the tractor.

At the forward end of the tractor and extending from the side thereof is a transverse tool bar 18, supporting a pair of parallel links 19 and 20 upon which is mounted a furrow-forming tool 21. A flexible tube 22 serving as a seed spout leads from the planting mechanism 14 to the furrow-forming tool 21 and is secured thereto. A bail 23 likewise supported upon transverse bar 18 is provided with an arm 24 having a swivel in the end thereof adapted to receive for sliding movement a rod 25 having its lower end connected to a bracket 26 supporting the ends of parallel links 19 and 20. A spring 27 is provided on the rod 25 between a collar 28 and arm 24, and a stop collar 29 is provided near the upper end of the rod 25. Links 19 and 20 are pivotally connected to bar 18 through the intermediary of a bracket 30, furrow-forming tool 21, and seed spout 22 thus having vertical pivotal movement with respect to the tractor 10.

Vertical movement of the material depositing mechanism, including the furrow-forming tool 21 and seed spout 22, is effected by an arm 31 secured to bail 23 and connected at its upper end by a rod 32 with a rock arm 33. Rock arm 33 is mounted upon the tractor for forward and rearward pivotal movement and is actuated by a hydraulic power unit 34 which preferably transmits power to the rock arm 33 through the intermediary of conventional double acting hydraulic cylinders, not shown.

Planter 14 is provided with a seed plate drive shaft 35 having mounted thereupon a sprocket wheel 36 driven in a manner to be hereinafter described.

Tractor 10 is provided with a conventional power plant which actuates the power lift means 34 and which includes a longitudinally extending drive shaft 37. Drive shaft 37 transmits power in a well known manner through rear axle 12 to the drive wheels 13. In advance of the rear axle 12 and also driven by the drive shaft 37 is a transverse brake shaft 38 through which braking power is transmitted to the rear wheels 13. Near its outer end, the shaft 38 is provided with a brake drum 39 enclosed in a housing 40.

Housing 40 has secured thereto a gear housing 41 comprising an outer casing 42 and an inner mating section 43 secured together and to the housing 40 by bolts 44. Secured to the hub portion of drum 39, by bolts 45, is an annular member 46 having projecting portions 47 engaging lugs 48 projecting from a beveled gear 49. Gear 49 is seated for rotation in a recessed portion 50 of housing section 43 and is provided on its face with teeth 51. Gear 49 is journaled upon the reduced portion 52 of a shaft 53 through the intermediary of a bushing 54. Shaft 53 is coaxial with brake shaft 38 and is rotatable in gear 49 and bearing 60. A plug 55 adjacent its inner end is fitted into a recess in gear 49.

Shaft 53 is provided with a radial opening 56 having a shaft 57 therein and preferably weldingly secured thereto. The ends of shaft 57 projecting radially from the shaft 53 have rotatably mounted thereon pinions 58 and 59.

The outer end of shaft 53 is journaled in a bearing 60 in the outer casing 42. Bearing 60 is provided with an inwardly projecting portion upon which is journaled a bevel gear 61 having teeth 62 meshed with pinions 58 and 59 on the side opposite gear 49.

It should now be clear that drive from the power plant of tractor 10 is transmitted through drive shaft 37 to brake shaft 38 and that brake shaft 38, through the interlocking of projections 47 of member 46 and lugs 48 of gear 49, drive the latter in the direction of rotation of the shaft 38. Rotation of gear 49 causes rotation of pinions 58 and 59, which in turn causes rotation of the gear 61 in a direction opposite from that of gear 49.

In order to transmit power from brake shaft 38 to rotate shaft 53, gear 61 must be immobilized and this is done by providing a shaft 62a journaled for rocking movement in the upper portion of casing 41 and having an arm 63 secured to the outer end thereof. Keyed to the shaft 62a at a location centrally thereof is an arm, or dog, 64 having a roller 65 rotatably mounted upon the end thereof adapted to engage projections 66 on the periphery of gear wheel 61. Thus when roller 65 is seated against one of the projections 66, the gear wheel 61 is held against rotation, and rotation of gear 49 causes pinions 58 and 59 to travel around the gear 61 and to rotate the shaft 53.

The end of shaft 53 has keyed thereto a sprocket wheel 67 which is drivingly connected by an endless chain 68 to the sprocket wheel 36 which drives the planting mechanism 14.

It should be apparent that a planetary gear drive has been provided for a dispensing mechanism in which the inner gear 49 is the sun gear, pinions 58 and 59, the planet gears, and outer gear 61 along with dog 64 constitute a clutch by which the drive connection between brake shaft 38 and shaft 53 may be disengaged by rocking arm 63. It may be noted that shaft 53 makes approximately one revolution for each two revolutions of shaft 38, and that the size of sprocket 67 need be altered only slightly to vary the operating speed of the dispenser.

It is, of course, desirable, when raising the implement out of the ground to inoperative position by forward rocking movement of rock arm 33, that the drive connection between brake shaft 38 and planting mechanism 14 be disengaged in order to discontinue the deposition of material from the hopper 15. The mechanism by which this may be accomplished automatically upon lifting the implement to inoperative position includes a link 69 pivotally connected at its forward end to a lug 70 projecting from rock arm 33 (see Figure 1). The rear end of rod 69 passes through and is slidably received in an opening in a pivot member 71 pivotally secured to the upper end of arm 63. The rear end of rod 69 is provided with a collar 72 and a spring 73 abuts the collar and the pivot member 71.

Dog 64 is biased to engaged position with one of the projections 66 by a spring 74 connected at one end to the arm 63 and at its other end to an anchor 75 secured by one of the bolts 44 to the housing 41.

It should now be clear that upon forward movement of rock arm 33 to raise the working tool from the ground, the roller 65 is disengaged from the gear wheel 61, whereupon the operation of the planting mechanism 14 is stopped.

It may be noted that, with forward movement of the tractor, and with the roller 65 of arm or dog 64 engaging one of the projections 66, brake shaft 38 and auxiliary shaft 53 revolve in a counter-clockwise direction. However, when the tractor is backed, as sometimes happens, it is desirable that the deposition of seed be stopped until the tractor is again moved forward. Therefore, when the tractor is backed, shaft 38 revolves clockwise and the direction of rotation of gear 49 and pinions 58 and 59 is reversed, causing the combination ratchet and gear wheel 61 to revolve counter-clockwise. Since the dog 64 is ineffective to stop rotation of gear 61, roller 65 merely rides over the periphery thereof. Further, when the planter drive mechanism becomes overloaded and sprocket 67 held against rotation, gear wheel 61 will rotate clockwise against the spring pressure holding dog 64 in position.

From the foregoing description, the operation of the improved planter drive of the present invention should be clear and it should be understood that, while the invention has been described in its preferred embodiment, modifications may be made therein without departing from the spirit thereof. Therefore, it is desired that the invention be limited only by the scope of the appended claims.

What is claimed is:

1. In combination, a tractor having a longitudinally extending drive shaft, agricultural dispensing mechanism mounted on the tractor for vertical movement to and from operating position, a transverse rear axle on said tractor driven from said drive shaft and carrying rear drive wheels, a transverse brake shaft in advance of said axle and driven from said drive shaft, and planetary gearing drivingly connecting said brake shaft and said dispensing mechanism.

2. In combination, a tractor having a longitudinally extending drive shaft, agricultural dispensing mechanism mounted on the tractor for vertical movement to and from operating position, a transverse rear axle on said tractor driven from said drive shaft and carrying rear drive wheels, a transverse shaft mounted on the tractor in advance of said axle, means drivingly connecting said drive shaft and said transverse shaft and planetary gearing drivingly connecting said transverse shaft and said dispensing mechanism.

3. In combination, a tractor having a power plant, agricultural dispensing mechanism mounted on the tractor for vertical movement to and from operating position, a first shaft on the tractor driven from said power plant, a second shaft coaxial with said first shaft, planetary gearing connecting said shafts, and means drivingly connecting said second shaft with said dispensing mechanism.

4. In combination, a tractor having a power plant, agricultural dispensing mechanism mounted on the tractor for vertical movement to and from operating position, a first shaft on the tractor driven from said power plant, a second shaft coaxial with said first shaft, planetary gearing connecting said shafts, means drivingly connecting said second shaft with said dispensing mechanism, means for interrupting the connection between said first and second shafts comprising a clutch, and means responsive to the movement of said dispensing mechanism to inoperative position for disabling said clutch.

5. The combination with a tractor having a power plant, of a dispenser mechanism mounted on the tractor for movement to and from operating position and having a driven part, a first shaft on the tractor driven from said power plant, a second shaft coaxial with said first shaft, means drivingly connecting said second shaft and said part, and a combined reduction gear and clutch assembly for transmitting power from said first shaft to said second shaft.

6. The combination with a tractor having a power plant, a rock arm, and power means actuated by the power plant for rocking the rock arm, of a dispenser mechanism mounted on the tractor for movement to and from operating position and having a driven part, a first shaft on the tractor driven from said power plant, a second shaft coaxial with said first shaft, means drivingly connecting said second shaft and said part, a combined reduction gear and clutch assembly for transmitting power from said first shaft to said second shaft, and connecting means between said rock arm and said clutch for disengaging the clutch upon movement of said rock arm in one direction.

7. The combination with a tractor having a power plant, a rock arm, and power means actuated by the power plant for rocking the rock arm, of a dispenser mechanism mounted on the tractor for movement to and from operating position and having a driven part, a first shaft on the tractor driven from said power plant, a second shaft coaxial with said first shaft, means drivingly connecting said second shaft and said part, and a combined reduction gear and clutch assembly for transmitting power from said first shaft to said second shaft, lifting linkage connecting said rock arm and said dispenser mechanism for moving the latter to and from operating position, and linkage connecting said rock arm and said clutch for disengaging the clutch upon movement of said rock arm to lift the dispenser mechanism to inoperative position.

8. The combination with a tractor having a power plant, a rock arm, and power means actuated by the power plant for rocking the rock arm, of a dispenser mechanism mounted on the tractor for movement to and from operating position and having a driven part, a first shaft on the tractor driven from said power plant, a second shaft coaxial with said first shaft, means drivingly connecting said second shaft and said part, a combined reduction gear and clutch assembly for transmitting power from said first shaft to said second shaft, lifting linkage connecting said power means and said dispenser mechanism for moving the latter to and from operating position, and linkage connecting said power means and said clutch for disengaging said clutch.

9. In combination, a tractor having a longitudinally extending drive shaft, agricultural dispensing mechanism mounted on the tractor for movement to and from operating position and having a driven part, a first shaft on the tractor driven from said drive shaft, a second shaft, means drivingly connecting said second shaft and said part, and planetary gearing connecting said first and second shafts for transmitting power therebetween.

HIRAM P. SMITH.

REFERENCES CITED

The following references are of record in the file of this patent:

UNITED STATES PATENTS

| Number | Name | Date |
|---|---|---|
| 2,004,416 | Orelind | June 11, 1935 |
| 1,985,370 | Hand | Dec. 25, 1934 |
| 2,361,083 | Burnett | Oct. 24, 1944 |
| 2,002,179 | Hitchcock | May 21, 1935 |
| 2,339,689 | Englund | Jan. 18, 1944 |